United States Patent
Connors et al.

(10) Patent No.: US 7,542,426 B1
(45) Date of Patent: Jun. 2, 2009

(54) APPARATUS AND METHOD FOR INTRA-TEAM MULTI-HOP BROADCASTING FOR EFFICIENT CONTROL SIGNALING IN WIRELESS AD-HOC NETWORKS

(75) Inventors: Dennis Connors, Mariposa, CA (US); Iordanis Koutsopoulos, College Park, MD (US)

(73) Assignee: HRL Laboratories, LLC, Malibu, CA (US)

( * ) Notice: Subject to any disclaimer, the term of this patent is extended or adjusted under 35 U.S.C. 154(b) by 704 days.

(21) Appl. No.: 11/090,639

(22) Filed: Mar. 25, 2005

(51) Int. Cl.
H04L 12/28 (2006.01)
(52) U.S. Cl. .................. 370/238; 455/445
(58) Field of Classification Search .......... 370/238; 455/445
See application file for complete search history.

(56) References Cited

U.S. PATENT DOCUMENTS

2004/0165532 A1* 8/2004 Poor et al. ............... 370/238
2004/0205105 A1* 10/2004 Larsson et al. ........... 709/200
2004/0219922 A1* 11/2004 Gage et al. ............... 455/445

OTHER PUBLICATIONS

I. Chlamtac, S. Kutten, "On broadcasting in radio networks—Problem analysis and Protocol design", IEEE Transactionson Comm., vol. 33. No. 12, pp. 1240-1246, Dec. 1985.

I. Chlamtac and S. Kutten, "Tree-based broadcasting in multi-hop radio networks", IEEE Transactions on communications, vol. 36, No. 10, pp. 1209-1223, Oct. 1987.
M.S. Corson and A. Ephremides, "A distributed algorithm for mobile wireless networks", Wireless Networks, vol. 1, No. 1, 1995.
J. Broch, D. A. Maltz, D. B. Johnson, Y.C. Hu and J. Jetcheva, "A performance comparison of multi-hop wireless ad-hoc network routing protocols", MobiCom 98.
T.H. Cormen, C.E. Leiserson and R. L. Rivest : "Introduction to Algorithms", McGraw-Hill, 1994.
R.K. Ahuja, T.L. Magnanti and J.B. Orlin: "Network flows: Theory, Algorithms and Applications", Pretice-Hall, 1993.
I. Koutsopoulos, D. Connors and S.K. Dao: "ITMB: A protocol for efficient control signaling in wireless ad-hoc networks", HRL Laboratories, Technical Report No. 607, Aug. 1999.

* cited by examiner

Primary Examiner—Ricky Ngo
Assistant Examiner—Luat Phung
(74) Attorney, Agent, or Firm—Tope-McKay

(57) ABSTRACT

A broadcast routing protocol and system for the efficient dissemination of control information in ad-hoc networks is disclosed. First, cost is assigned for each link and/or node in the network. In some aspects, cost is assigned using minimum inverse degree (MID-) or combined (C-) cost. Next, a graph-theoretic entity is computed at each node. In some aspects, this entity is Minimum Spanning Tree (MST) or Modified Minimum Weighted Node Cover. Finally, an appropriate packet forwarding protocol is used to forward control information. The present invention exhibits improved bandwidth consumption versus flooding and is robust in several node mobility scenarios.

6 Claims, 9 Drawing Sheets

APPARATUS AND METHOD FOR INTRA-TEAM MULTI-HOP BROADCASTING FOR EFFICIENT CONTROL SIGNALING IN WIRELESS AD-HOC NETWORKS

GOVERNMENT CONTRACT

At least a portion of the subject matter herein is related to U.S. Government Contract Number DAAB0797-C-D607. The United States government may have certain rights in this invention under this contract.

BACKGROUND OF THE INVENTION (1) Technical Field

The present invention relates to the field of wireless networks. More particularly, the present invention presents techniques for efficiently broadcasting information through a wireless network.

(2) Discussion

Growth in mobile wireless networks is fueled by the current increase in demand for telecommunication services. Cellular networks provide mobile users with the ability to be reached while in motion in defined coverage areas. Frequently, however, mobile users need to be able to communicate in situations where no fixed wired or wireless infrastructure is available, either because it may not be economically or physically feasible, or because the expediency of the situation does not permit installation. In such situations, a collection of mobile hosts may form a temporary network without the aid of any pre-established infrastructure or centralized administration. This type of wireless network is known in the art as an ad-hoc network. A node in such a network is a communicating entity, such as a mobile host or a sensor.

In very large network population situations, efficient resource handling requires that nodes be partitioned into teams. One of the principal actions of a mobile host is the dissemination of control messages to all other nodes in the team that share the same physical channel (frequency in FDMA, carrier and timeslot in TDMA, or code in CDMA systems). This procedure is known as Intra-Team Broadcasting. In mobile ad-hoc networks, control messaging is increased due to the inherent dynamic nature of the network. The lack of a central arbitrating agent also necessitates the existence of a robust and efficient packet broadcasting protocol. Control information about network status must be delivered in a timely and resource-efficient manner, so as not to prevent the channel from executing other protocols.

Presently, most control information broadcasting protocols, like classical radio communication networks, use flooding. In this approach, when a node receives a message, it relays it to all of its neighbors. Although flooding appears as the only reliable solution when the rate of topology change is high, it is not generally recommended in stationary or low mobility cases, as it results in intensive message circulation in the network. In such situations, additional bandwidth is consumed.

It is therefore desirable to develop an optimal broadcasting protocol for ad-hoc networks such that bandwidth consumption and maximum time delay are minimized. Several centralized or distributed methods for efficient, near-optimal, broadcasting in classical radio communication networks have been proposed and studied in the literature to date. Although some of these existing routing techniques can potentially be modified and used for broadcasting networks, simplicity and direct applicability are required to transmit control information reliably in broadcasting networks. Further, from the perspective of packet routing, it is desirable that such routing schemes be proactive, i.e., when a node is forwarding a message, the route should already be known and immediately applicable so that the forwarding delay is minimized

SUMMARY OF THE INVENTION

The present invention provides a method, an apparatus, broadcast routing protocol, and a computer program product for facilitating the broadcast of packets through a computer network including a plurality of nodes. The invention begins by assigning topology-dependent costs to a network feature selected from a group consisting of nodes in the network and links between nodes in the network. The next operation of the present invention is determining optimal routes between all of the nodes in the network using the topology-dependent costs assigned to the network feature. After the costs have been assigned and the routes determined, an operation is performed for forwarding packets from an originating node along optimal routes from the originating node to all other nodes in the network, whereby packets from the originating node are broadcast throughout the network.

In another aspect of the present invention, the operation of determining optimal routes is performed using a graph-theoretic entity computed at each node in the network, and wherein in the operation of forwarding packets, at least a portion of each packet comprises control information for use at each node to determine whether to forward the packet.

In still another aspect, the graph-theoretic entity is a minimum spanning tree of the node.

In yet another aspect of the present invention, in the operation of assigning costs, costs are assigned using a minimum inverse degree cost assessment technique.

In a further aspect of the present invention, each node has a degree and the cost is assigned for links according to the relationship:

$$c(i,j) = \min\left\{\frac{1}{\deg(i)}, \frac{1}{\deg(j)}\right\},$$

where i and j are nodes in the network, c (i,j) is the cost of a link between i and j, deg(i) is the degree of node i, and deg(j) is the degree of node j.

In still further aspect, the operation of forwarding packets is performed by determining whether all of the nodes in the network have the packet and determining whether a current node is the broadcasting node. When the current node is the broadcasting node, broadcasting the packet, and when the current node is not the broadcasting node, determining whether the current node already received this packet via a minimum spanning tree link in the past. If the node has already received this packet via a minimum spanning tree link in the past, doing nothing. If the node has not received this packet via a minimum spanning tree link in the past, determining whether the current node has just received a packet over a link, Li. When the node has not just received a packet over a link Li, doing nothing. If the node has just received a packet over a link Li, determining whether the link Li belongs in the minimum spanning tree. When the link Li does not belong in the minimum spanning tree, doing nothing. If the link Li belongs in the minimum spanning tree, determining whether there exist other links than Li in the minimum spanning tree. If there are no other links than Li in the minimum spanning tree, doing nothing, and when there are other links than Li in the minimum spanning tree, broadcasting a packet from the current node.

In still another aspect, in the operation of assigning costs, costs are assigned using a combined cost assessment technique.

In a still further aspect, the costs are assigned according to the relationship:

$$c_i = \frac{1}{\deg(i)} + \frac{\min_{j \in I_M} d(i,j)}{\text{diam}(G)} + \frac{\min_{j \in I_m} d(i,j)}{\text{diam}(G)},$$

wherein ci is the cost of node i, d(i,j) is the distance of the link between nodes i and j, $I_M$ is the node with the largest degree in the network and $I_m$ is the node with the smallest degree in the network and, wherein combined cost is assigned for each link using the equation, $c(i,j) = \min\{c_i, c_j\}$, wherein c(i,j) is the cost of the link between nodes i and j, and $c_j$ is the cost of node j.

In another aspect, the graph theoretic entity is a node cover determined at each node.

In a still further aspect, the node cover is a modified minimum weighted node cover computed at each node in the network, and where the network includes a total number of nodes N consisting of a fast set of nodes Q that cover other nodes in the network and a second set of nodes R that are covered by the first set, where i and j represent nodes in the network, and wherein the modified minimum weighted node cover is computed by a series of operations. The first operation is setting the first set of nodes Q and the second set of nodes R to empty/null. Next, an operation of picking a node i from the set N where node i has a minimum cost is performed. A further operation is performed for including nodes j that are adjacent to nodes i in set B. The next operation is removing node i from set N. The following operation is adding node i to set Q. Then an operation of determining whether set N is empty/null is performed. Next, when set N is not empty/null, picking the minimum cost node i from set B. The next operation takes place by including nodes j that are adjacent to nodes i in set B. Then an operation is performed for removing node i from set N and adding node i to set Q, and repeating the step of determining whether set N is empty/null and subsequent steps until it is determined that set N is empty/null. When it is determined that set N is empty/null, an operation is performed for setting a modified minimum weighted node cover set equal to Q.

In this case, the operation of forwarding packets is performed by operations including first determining whether all of the nodes in the network have the packet. Next, an operation is performed for determining whether a current node is the broadcasting node, and when the current node is the broadcasting node, broadcasting the packet. On the other hand, when the current node is not the broadcasting node, an operation is performed for determining whether the current node already received this packet in the past. If the node has already received this packet, no action is taken; and if the node has not received this packet, a determination is made as to whether the current node has just received the packet. When the node has not just received the packet, no action is taken. When the node has just received the packet, a determination is made whether the node is in the modified minimum weighted node cover set. When the node is not in the modified minimum weighted node cover set, no action is taken. If the node is in the modified minimum weighted node cover set, an action of broadcasting the packet from the current node is performed.

In another aspect, costs are assigned using a minimum inverse degree cost assessment technique or by the combined cost assessment technique as described before.

DETAILED DESCRIPTION

Figure 1:
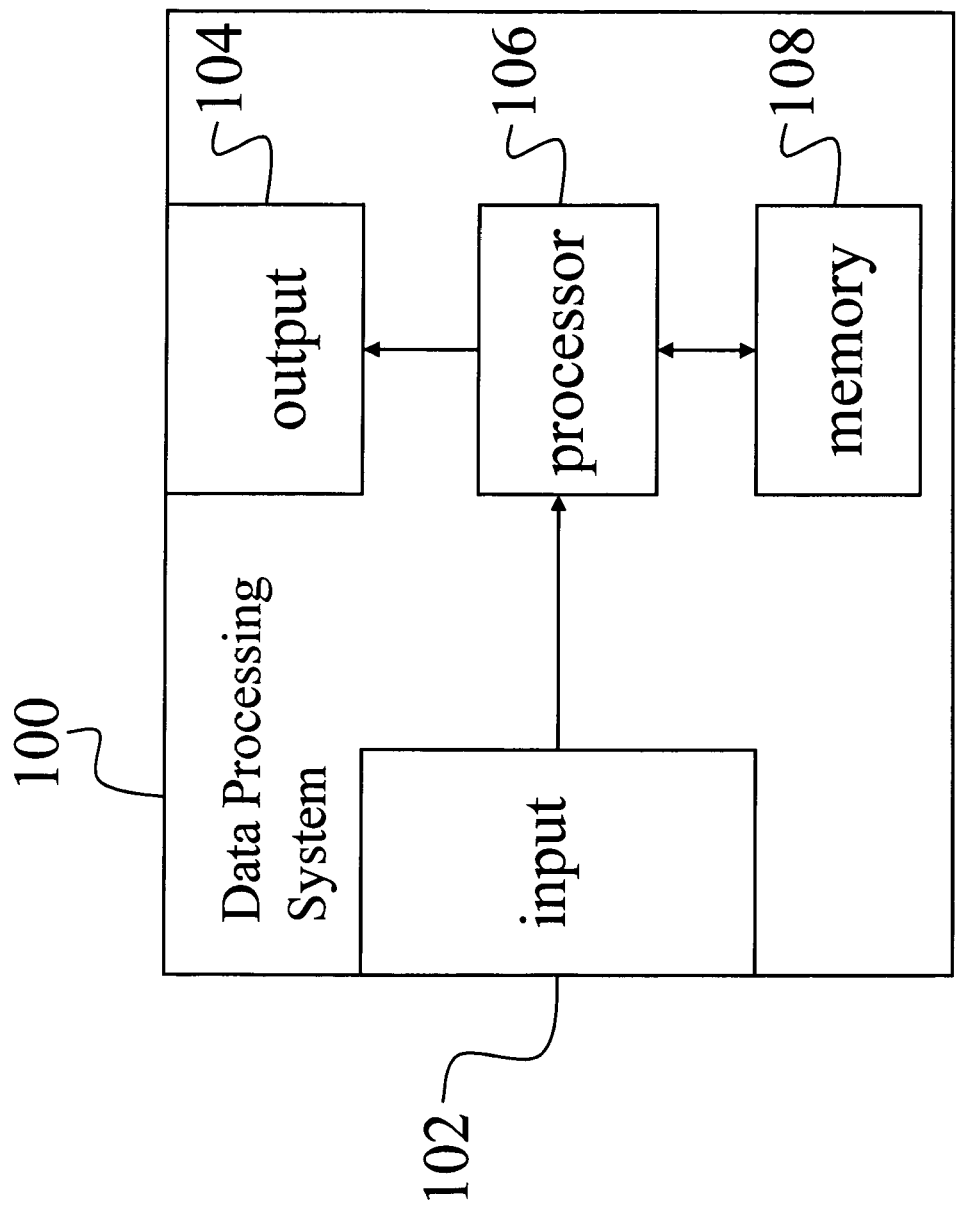
FIG. 1 is a block diagram depicting a data processing system used in conjunction with the present invention.

The present invention relates to the field of wireless networks. More particularly, the present invention presents techniques for efficiently broadcasting information through a wireless network. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art; and the general principles defined herein, may be applied to a wide range of aspects. Thus, the present invention is not intended to be limited to the aspects presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various physical aspects of the present invention is provided. Third, an introduction is provided to give the reader a general understanding of the invention. Finally, a discussion is provided to give an understanding of the specific details.

(1) Glossary

Before describing the specific details of the present invention, a centralized location is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Means—The term "means" as used with respect to this invention generally indicates a set of operations to be performed on a computer, and may represent pieces of a whole program or individual, separable, software modules. Non-limiting examples of "means" include computer program code (source or object code) and "hard-coded" electronics (i.e. computer operations coded into a computer chip). The "means" may be stored in the memory of a computer or on a computer readable medium.

(2) Principal Aspects

The present invention has three principal aspects. The first is a system for communicating information packets (i.e., a "node"), typically in the form of a computer system operating software or in the form of a "hard-coded" instruction set. This system may be incorporated into various devices, such as general purpose computer systems, handheld computing devices, cellular phones, automotive-based computing devices, etc. The second principal aspect is a method, typically in the form of software, operated using a data processing system (computer). The third principal aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These aspects will be described in more detail below.

A block diagram depicting the components of a computer system used in the present invention is provided in FIG. 1. The data processing system 100 comprises an input 102 for receiving information from at least one communication device (e.g., an antenna). The input 102 may include multiple "ports." Typically, input is received from an antenna in communication with the antennas of other data processing systems 100, with a group of data processing systems forming a network. The output 104 is connected with the processor for providing information for transmission to other data processing systems 100 (nodes) in the network. Output may also be provided to other devices or other programs, e.g. to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software to be manipulated by commands to the processor.

Figure 2:
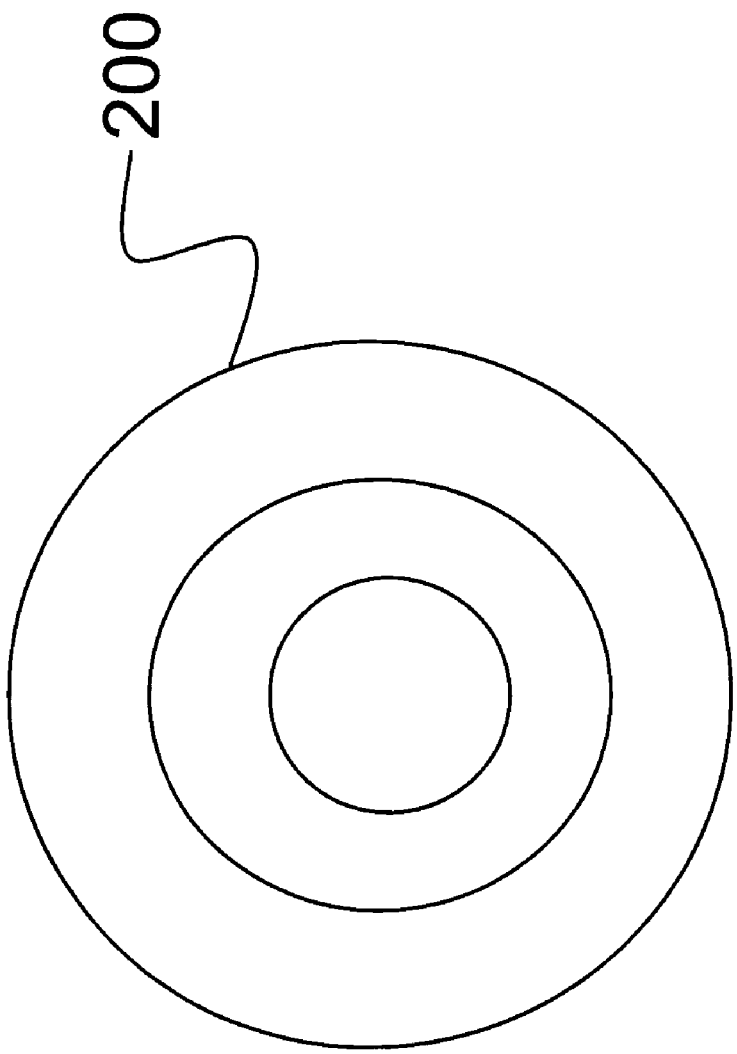
FIG. 2 is an illustrative diagram depicting a computer program product aspect the present invention.

An illustrative diagram of a computer program product embodying the present invention is depicted in FIG. 2. The computer program product 200 is depicted as an optical disk such as a CD or DVD. However, as mentioned previously, the computer program product generally represents computer readable code stored on any compatible computer readable medium.

(3) Introduction

Figure 3:
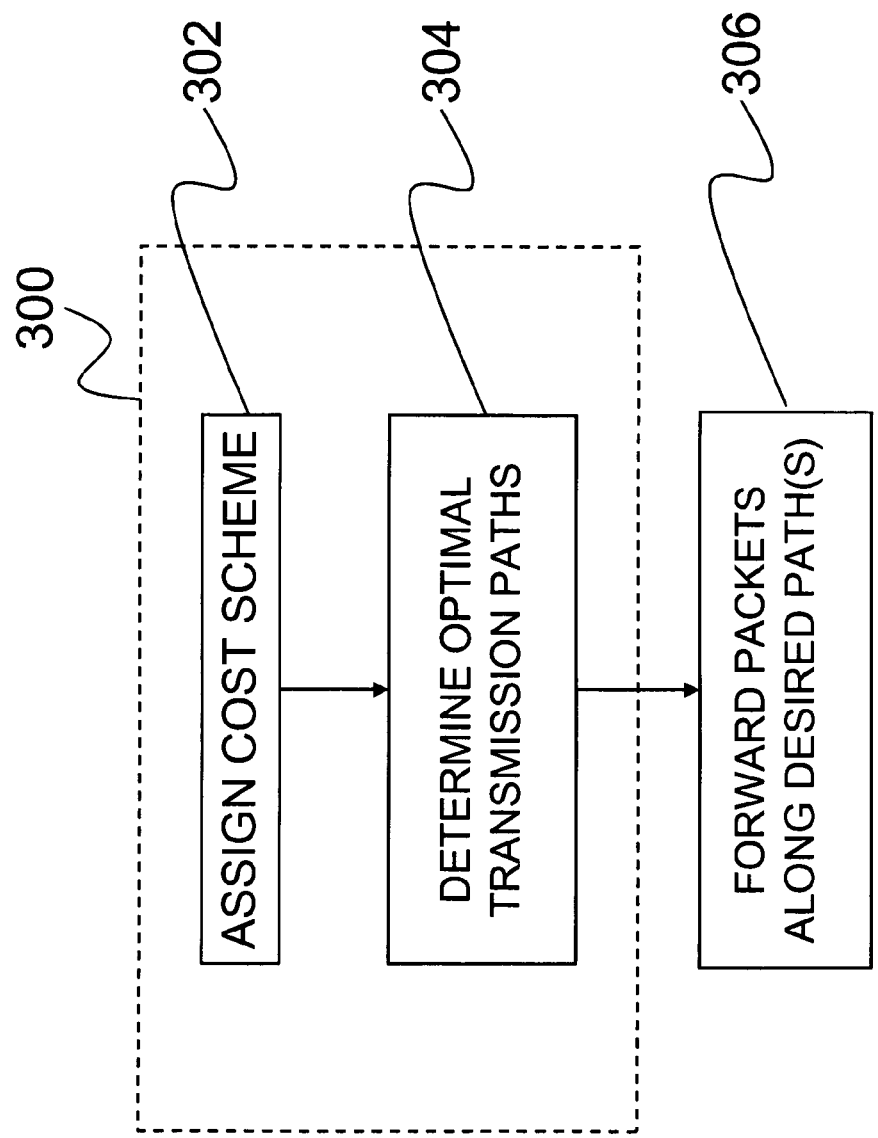
FIG. 3 is a flow chart depicting the general operations of the present invention.

The present invention provides a broadcast method, apparatus, and computer program product for disseminating control information with improved efficiency in wireless ad-hoc networks. The routing technique of the present invention operates in two general stages, as depicted in FIG. 3. First, topology-dependent cost-based optimal routes are determined for the network 300. This stage comprises two substages. In the first substage, a cost assignment scheme is applied 302, where a cost assignment is computed for links or nodes in a network of nodes. Non-limiting examples of techniques that may be used to make the cost assignment include the Minimum Inverse Degree (MID) and Combined (C-) cast assessment techniques. Briefly, MID is a cost measure that considers only the inverse of the degree of a node, whereas the C-technique is essentially a modified version of the MID cost, enhanced with terms relating to the distance of a node from maximum and minimum degree nodes of the network. The purpose of the topology-dependent cost assignment is to provide information to aid in the determination of cost-efficient paths through a set of nodes by which communications may be routed. After costs have been assigned to the various nodes or paths in the network, depending on the needs of a particular application, graph-theoretic techniques such as the Minimum Spanning Tree (MST) and the Modified Minimum Weighted Node Cover (MMWNC) are determined for each node of the network in order to determine optimal transmission paths 304. The MST is a technique based on a MST computation at each node. The MST is a set of links that form the minimum connected subgraph of a network such that there will always exist a path from a node to any other node. The MMWNC, on the other hand, is a protocol based on the constitution of a set of nodes "covering" the entire network. Each node will either belong to that set or will be one hop away from (i.e., adjacent to) a node in the set. Both of the techniques for computing graph-theoretic entities discussed above, namely the MST and MMWNC, assume that cost assignment computations have already been performed. After the graph-theoretic entities have been computed separately at each node, in the next stage control packets are forwarded 306 according to a Packet Forwarding Algorithm (PFA), where only the MST links or MMWNC nodes are employed in packet broadcasting. As will be appreciated by one of skill in the art, a variety of schemes may be selected for the cost assignment computations, for computation of the graph-theoretic entities, and for the PFA. The selection of a particular scheme depends on the particular hardware constraints of the communication devices used as well as on performance tradeoffs such as update rate versus data transfer efficiency, as will be readily apparent to one of skill in the art.

The discussion below illustrates the operation of the present invention in the context of the cost assignment via MID and C-techniques and graph-theoretic entity determination by MST and MMWNC techniques. A packet forwarding technique is then presented for each case. It is noteworthy that the present invention can apply to any wireless ad-hoc network, which will carry real-time broadcast traffic, User Datagram Protocol (UDP) traffic, or traffic requiring some form of Quality of Service (QoS).

(4) Discussion

One of the principle actions of a mobile host in an ad-hoc network is the dissemination of control messages to other nodes that share the same physical channel (frequency in FDMA, carrier and timeslot in TDMA, or code in CDMA systems). In mobile ad-hoc networks, control messaging is increased due to the inherent dynamic nature of the network. The lack of a central arbitrating agent also necessitates the existence of a robust and efficient packet broadcasting protocol. Control information about network status must be delivered in a timely and resource-efficient manner, so as to avoid preventing the channel from executing other protocols.

Traditional radio networks perform control message broadcasting with flooding. Each node which receives the message relays it to all of its neighbors. Although flooding appears as the only reliable solution when the rate of topology change is high, it is not generally recommended in stationary or low mobility cases, as it results in intensive message circulation in the network, and additional bandwidth consumption. Thus, the present invention presents two heuristic techniques for control information dissemination, both of which outperform the traditional flooding technique in terms of bandwidth consumption and demonstrate satisfactory packet dissemination time delay. The techniques described herein are robust in cases involving moderate mobility, such as link failure or lack of global topology knowledge. Their employment can lead to efficient resource management since the channel resources can be utilized in the execution of other protocols. Moreover, algorithm simplicity and low computational complexity contribute to information dissemination in a resource-efficient and timely manner.

In general, the problem of constructing an optimal broadcasting protocol, so that bandwidth consumption or maximum time delay are minimized, has been shown to be NP-hard. Heuristic techniques are therefore used to provide upper bounded performance with respect to these measures. As mentioned in the Background section above, the majority of control information broadcasting techniques use flooding. The present invention may be used either as an alternative or supplement to flooding techniques.

The present invention thus focuses on the problem of efficient broadcast routing of control information in wireless ad-hoc networks. A message is originated from a single node and is transmitted to all other nodes in the network. The invention deals with the issue of routing the message through the network in a manner that takes advantage of the special properties of the radio communication medium, where a transmission from a node reaches all nodes within line of sight range of the originating or forwarding node.

Below, starting from graph-theoretic principles, two example heuristic techniques are demonstrated for control information dissemination. Both techniques outperform the traditional flooding technique in terms of bandwidth consumption. The first technique is based on the construction of a minimum spanning tree and uses message forwarding along the tree links. In this scenario, two alternative methods for determining the cost associated with each link are considered. The second technique is based on a modified version of the node cover problem.

A control information distribution method should transmit information to all nodes reliably and efficiently. From a packet routing perspective, it is desirable that broadcast techniques be proactive, i.e., when a node needs to forward a message, the route is already known and can be immediately applied, so that the forwarding delay is minimized.

(a) Minimum Spanning Tree (MST) Approach

The Minimum Spanning Tree (MST) technique is known to those skilled in the art, and may be used as a topology-dependent cost assignment technique to assign costs along different links among a set of nodes. For the purposes of this immediate description, it is assumed that each node in the ad-hoc network has completed the network initialization phase, i.e., the network has already obtained global connectivity information and cost assignments have been completed (see below). In this aspect of the invention, each node in the ad-hoc network computes the MST of the network at certain time instants, and message dissemination takes place across the links of the MST. However, due to the broadcast nature of the wireless channel, other non-MST links will carry the message as well. An underlying principal behind the MST heuristic is that it provides a way to distribute a packet efficiently, since the MST constitutes the minimum connected subgraph of a given network.

Reliable execution of the technique of the present aspect presupposes the construction of a unique MST at each node separately, after costs have been assigned to links. When two or more links demonstrate equal cost values, different trees can be stored at each node, thereby leading to node data inconsistency. This limitation may be overcome by utilizing simple network link enumeration known to those skilled in the art. Accordingly, if two links have equal cost, the minimum indexed link is selected and attached to the tree.

The MST according to this aspect of the invention may be determined using a technique known to those skilled in the art including, but not limited to, the well-known Kruskal's or Prim's algorithm. Where computational complexity is required, Prim's algorithm can be utilized. Prim's algorithm requires additional data structures stored at each node and builds a MST by adding links one at a time. It maintains a tree spanning a subset of nodes and each time a node is added, it is added such that the incurred cost is minimum. In one aspect of the present invention, the Fibonnacci Heap data structure, known in the art, can be used to improve the efficiency of information dissemination using Prim's technique. If information storage capacity, rather than computational complexity is important, Kruskal's algorithm can be utilized. The ultimate selection of the implementation method is based on the cost tradeoff between computation complexity and information storage at each node.

The topology-dependent cost assessment for the broadcasting routing protocol according to the present invention may be performed by methods including, but not limited to, Minimum Inverse Degree (MID) and Combined (C-) cost methods, which are known to those skilled in the art. For these methods, the degree (number of nearest neighbors) is determined. Well-connected nodes efficiently disseminate information because many nodes are available to receive the transmission. The MID cost method simply considers the inverse of the degree of a node in determining cost. The C-cost method is based on the MID cost method, but is further enhanced with terms relating to the distance of a node from maximum and minimum degree nodes of the network. Each of these cost assessment methods is discussed in more detail below with respect to the MST.

i. MID-MST Approach

In one aspect of the present invention, the MID cost assessment method and MST are utilized together to generate a broadcast routing protocol. In this aspect, the cost function below is used to determine the cost of link (ij), which represents a link connecting node i and node j:

$$c(i, j) = \min\left\{\frac{1}{\deg(i)}, \frac{1}{\deg(j)}\right\} \quad (1)$$

where the degree of node i or j is equal to the number of immediate neighbors of the node. The intuitive explanation for this cost is that well-connected nodes will efficiently disseminate messages, since many nodes will hear the transmission. Therefore, links to highly-connected nodes are included in the MST, and represent a "route" over which the message will be efficiently distributed in terms of bandwidth and delay.

Figure 4:
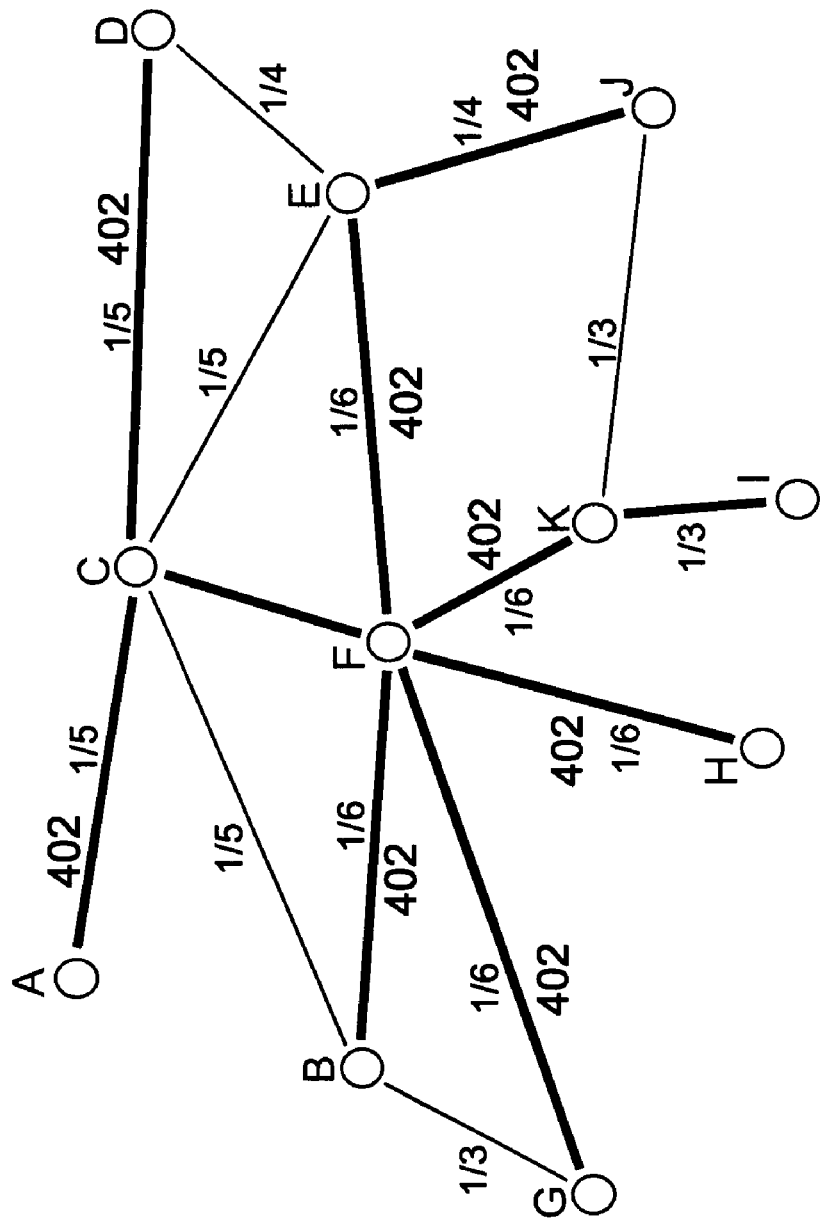
FIG. 4 is an illustrative diagram depicting an ad-hoc network with links selected by the MID-MST approach.

An illustration of the MID-MST aspect of the present invention in provided in FIG. 4. In the ad-hoc network 400 shown, the MST links 402 selected by the protocol are identified by the thicker lines. The C-MST approach will be discussed next.

ii. C-MST Approach

In another aspect of the present invention, the combined cost assessment method is utilized in conjunction with the MST technique to develop the broadcast routing protocol. The cost function in this aspect depends not only on the degree, but also on the location of the node relative to the minimum and maximum degree nodes.

For each node i, a combined cost value is determined:

$$c_i = \frac{1}{\deg(i)} + \frac{\min_{j \in I_M} d(i,j)}{\text{diam}(G)} + \frac{\min_{j \in I_m} d(i,j)}{\text{diam}(G)} \quad (2)$$

where $I_M$ and $I_m$, respectively, are those nodes that have the maximum or minimum degree in a network, diam(G) is the broadcast range of the node (it can also be used to represent a user determined distance from a node of interest), and d (i,j) is the shortest path distance between nodes i and j. A cost is then determined for the link between nodes i and j:

$$c(i,j) = \min\{c_i, c_j\} \quad (3)$$

The link is inserted into the MST when it meets one or more of the following criteria (note that the parameters that define a "high" degree and "close" are to be set depending on the particular requirements of a specific application, as will be appreciated by one of skill in the art):

a. It has a high degree, so that it is connected to several other nodes that will receive the message upon broadcasting;
b. It is "close" to the minimum degree node, which receives the message via a limited number of links; or
c. It is "close" to the maximum degree node, so that a message will reach it in a minimum number of hops to allow further message distribution to occur efficiently.

Figure 5:
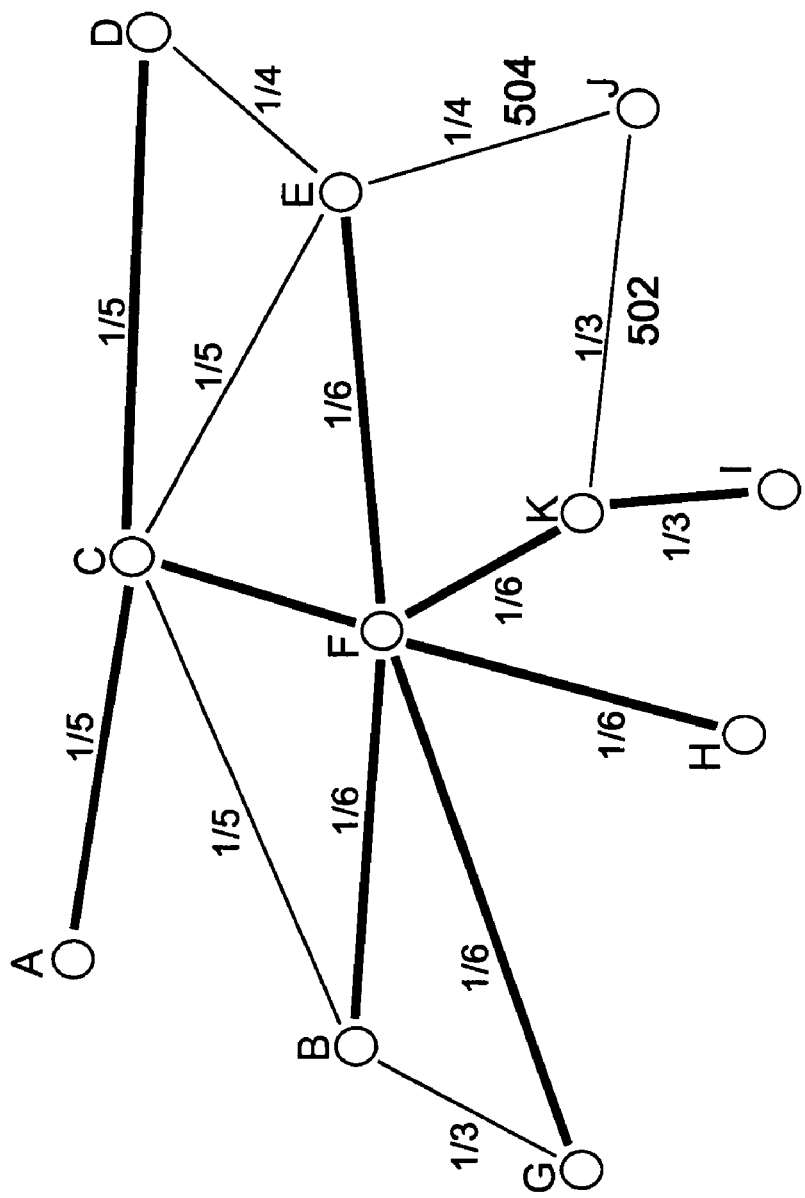
FIG. 5 is an illustrative diagram depicting an ad-hoc network with links selected by the C-MST approach.

A comparison of these two alternate aspects of the present invention shows that the links generated by the C-MST approach are similar to the links generated by the MID-MST approach. Note that for the ad-hoc network 500, as shown in FIG. 5, the link JK 502 was the link selected by the C-MST protocol from node J whereas the link JE 504 was selected by the MID-MST protocol. This single adjustment resulting from use of the more complex C-MST protocol reduces the number of broadcasts required for the dissemination of a broadcast message, thereby reducing needed bandwidth and decreasing the delivery time delay versus the MID-MST protocol; however, MID-MST provides lower computational complexity. Thus, under these constraints, the present invention can be adapted to the particular needs of a given communication scenario. It is noteworthy that, as will be appreciated by those skilled in the art, the formulation of the combined cost function can be modified in a variety of ways. For example, diam(G) may be replaced with a radius/straight-line distance from a node to the minimum or maximum degree node to weight links from the current node to them based on the degree of link "straightness" to ensure efficient distance coverage. Further, different weights may be placed on the degree of connectedness portion of the equation versus the distance measurement portions of the equation. Next, a packet forwarding algorithm for use with the MST technique will be discussed.

iii. MST Packet Forwarding Algorithm (MST-PFA)

Figure 6:
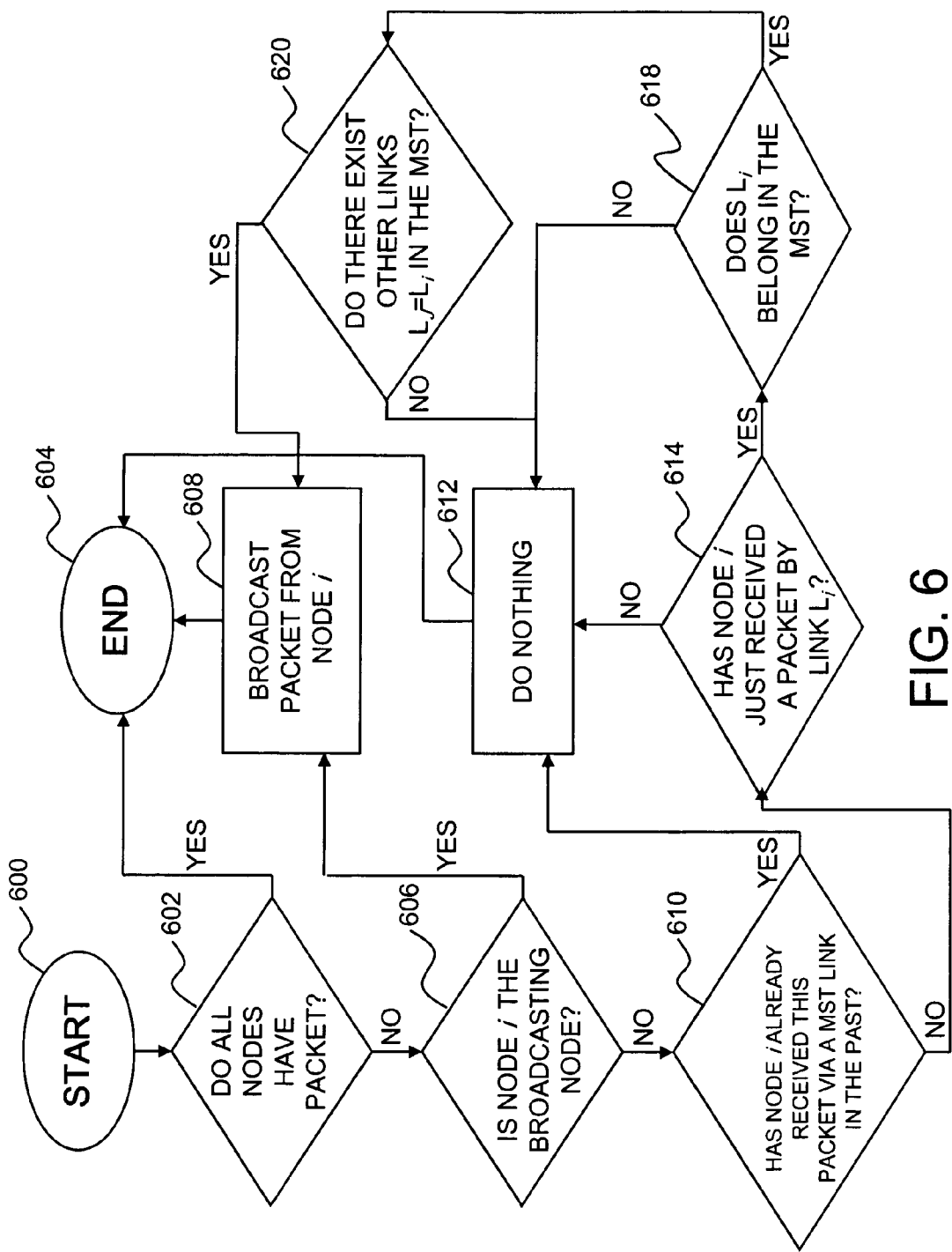
FIG. 6 is a flow chart depicting the steps of the MST-PFA.

A flowchart showing the operations of a MST Packet Forwarding Algorithm (MST-PFA) for use with the present invention is depicted in FIG. 6. When using a heuristic such as a MST, a packet forwarding algorithm (PFA) or protocol is used to distribute packets of information to the entire network. For an application in which the MST heuristic is utilized, the PFA takes advantage of the links created. The PFA is expected to run in a real-time mode in a constantly changing communication environment. Thus, it is desirable that the tasks required of each node upon reception of a packet be minimized. After the start of the PFA 600, a check is performed to determine whether all of the nodes have the packet 602. If all of the nodes already have the packet, the PFA ends 604. On the other hand, if not all of the nodes have the packet, a check is performed to determine whether the current node i is the broadcasting node 606. If the current node i is the broadcasting node, it broadcasts the packet 608 and the routine ends 604. If the current node i is not the broadcasting node, a check is performed to determine whether the current node i has already receive the packet in the past via a MST link 610. If the current node i has already received the packet in the past via a MST link, it does nothing 612 and the routine ends 604. On the other hand, if the node has not received the packet in the past via a MST link, a check is performed to determine whether the current node i just received a packet by link Li 614. If the current node did not just receive a packet by link L; it does nothing 612 and the routine ends 604, as the packet must have been received in the past. Note that blocks 610 and 614 may be combined into one logical operation if these are the only two possibilities. If, on the other hand, the current node did just receive a packet by link L, a check is performed to determine whether the link Li belongs in the MST 618. If the link Li does not belong in the MST, the node i does nothing 612 and the routine ends 604. On the other hand, if the link Li belongs in the MST, a check is performed to determine whether there exist other links Li, where Li is different from Li, away from the current node i 620. If another such link exists, the current node i transmits the message along that link 608 and the routine ends 604. If no other such links exist, the current node i does nothing 612 and the routine ends 604.

In most cases, communications through the network occur in a series of frames (e.g., time frames). In these cases, the routine above is performed at every node in the network during each frame. A non-limiting example of a pseudocode block that provides the functions of this aspect of the present invention is as follows.

```
while (not all nodes have the packet) do
    begin
        for each node i do:
            if (i = Broadcasting Node) Broadcast Packet
            else if (i has already received packet via a MST link) do nothing;
            else if (i has just received packet via link L_i);
                begin
                    if (L_i does not belong in the MST) do nothing;
                    else if (L_i belongs in the MST)
                        begin
                            if (∃ other links L_j ≠ L_j in MST) Broadcast Packet;
                            else do nothing;
                        end;
                end;
        end.
```

As is discussed more thoroughly with respect to FIG. 6, upon reception of a packet, a node needs to have information regarding the link through which the packet was received, whether this link belongs to the MST, and whether there exist other links belonging to the MST, so that it can forward the packet further. Note that if a node has already received a packet via a non-MST link, it will behave as if it has not received the packet. In other words, only a reception through an MST link causes the node to further investigate whether there exists another MST link on which to forward the packet. Packets are forwarded via MST links until all nodes have received the message.

For any static network utilizing the MST approach of the present invention, all nodes of the network will eventually receive the packet. The number of broadcast transmissions is finite and is limited by the number of nodes in the network. Further, the transmission of packets is loop-free.

Next, the Modified Minimum Weighted Node Cover (MMWNC) approach will be described.

(b) Modified Minimum Weighted Node Cover (MMWNC) Approach i. The MMWNC Setup

Another aspect of the present invention utilizes a modified version of the classical Node Cover heuristic, known to those skilled in the art, in order to disseminate control information in a network. This modified heuristic shall be referred to herein as the Modified Minimum Weighted Node Cover (MMWNC) approach.

As described for the MST approach above, the MMWNC approach also requires the assignment of costs for each node. As with the MST approach, the cost function used with the MMWNC approach may be Minimum Inverse Degree (MID) or Combined (C-) cost. However, the MMWNC approach assigns node costs instead of link costs.

The MMWNC set is created with a greedy algorithm. A variety of greedy algorithms are known to those skilled in the art. Given a node cost assignment (via the MID or C-cost assignment schemes), the algorithm repeatedly selects the node with the minimum cost, provided that the next chosen node is adjacent to an already selected node. For nodes in a network N, the greedy algorithm generates in a subset Q of nodes forming a chain, such that each node is either in the chain or at most one hop away from a node in the chain, and such that the sum of the assigned costs of the nodes in the chain is minimized. In the algorithm below, R denotes the set of nodes that are covered by the subset Q, and i and j are nodes.

```
begin
  Q→Ø, R→Ø
  Pick i∈N with the minimum cost.
  R→R∪{j: j∈Adj(i)}
  N→N−{j: j∈Adj(i)}
  Q→Q∪{i}
  while N≠Ø do
    begin
      Pick i∈R with the minimum cost
      Q→Q∪{i}
      R→R∪{j: j∈Adj(i)}
      N→N−{j: j∈Adj(i)}
    end
  MMWNC→Q
end
```

Figure 7:
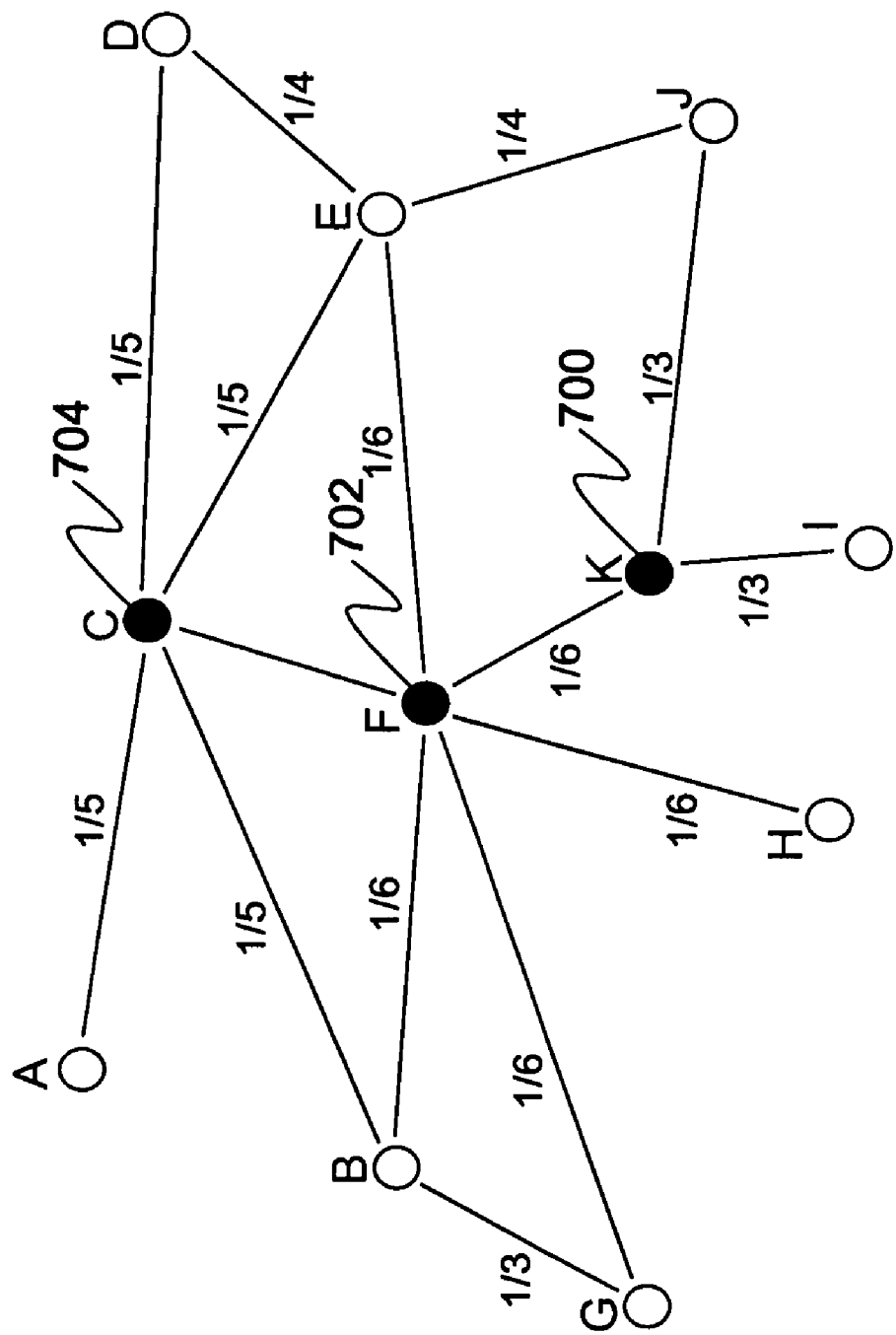
FIG. 7 is an illustrative diagram depicting an ad-hoc network with nodes selected by the MMWNC approach.

In algorithm above, the symbol "→" indicates an assignment of the expression on the right hand side to the variable on the left hand side, Ø represents the Null set, ∪ represents the union (conjunction) operator, Q represents the MMWNC set, B represents the set of nodes covered by the MMWNC set, N represents the total set of nodes, and the statement "j: j∈Adj (i)" translates to "a node j such that node j is an element of the set of nodes adjacent (one hop from) node i." As shown in FIG. 7, the MMWNC subset generated by this approach consists of node K 700, node F 702, and node C 704.

Figure 8:
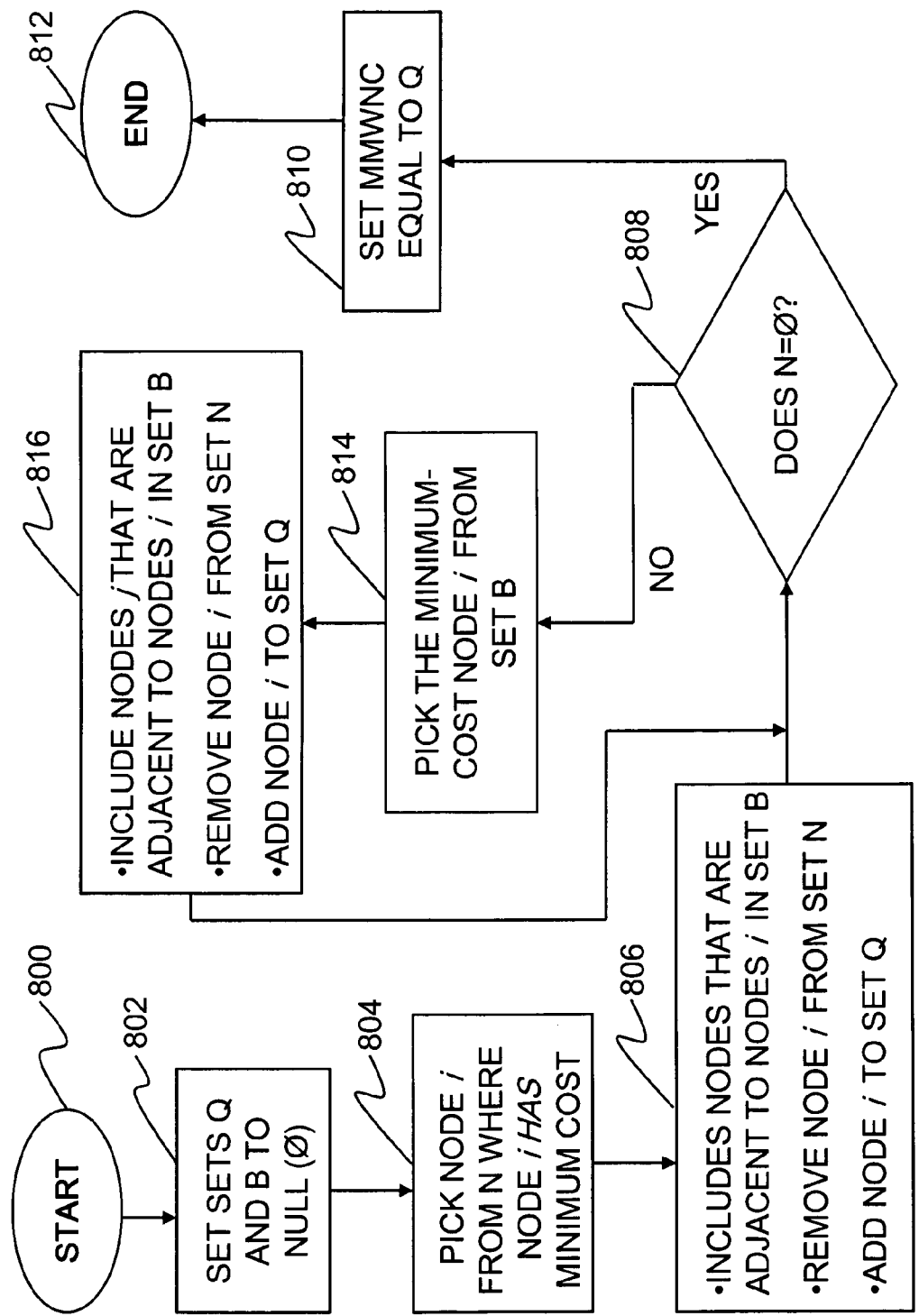
FIG. 8 is a flow chart depicting the steps of the MMWNC greedy algorithm.

The operations in the pseudocode are also shown for clarity in the flow chart of FIG. 8. After starting 800, sets Q and B are set equal to the null set 802. Next, a node i is picked from the overall set of nodes N, where node i has a minimum cost 804. Then, the operations are performed 806. These operations include adding nodes j that are adjacent to nodes i to set B as well as removing node i from set N and adding node i to set Q. After these three operations have been performed, a check is made to see whether the overall set of nodes N has been exhausted (is null) 808. If the overall set of nodes N has been exhausted, the set Q is considered finalized, and is assigned as the MMWNC set 810. The routine is then ended 812. If, on the other hand, the overall set of nodes N is still populated, the minimum-cost node i is picked from set B 814 (this is a new node i, since the previous node i is now in set Q). Next, the same three steps that were performed in block 806 are repeated for the minimum-cost node i, picked from set B 816. The cycle is repeated until all of the nodes in set N have been exhausted, and the routine is ended. At the end of the routine, all of the nodes in set N have been distributed to sets B and Q, and set Q is assigned as the MMWNC set. With the MMWNC set determined, the packet forwarding algorithm may be applied.

ii. MMWNC Packet Forwarding Algorithm (MMWNC-PFA)

Figure 9:
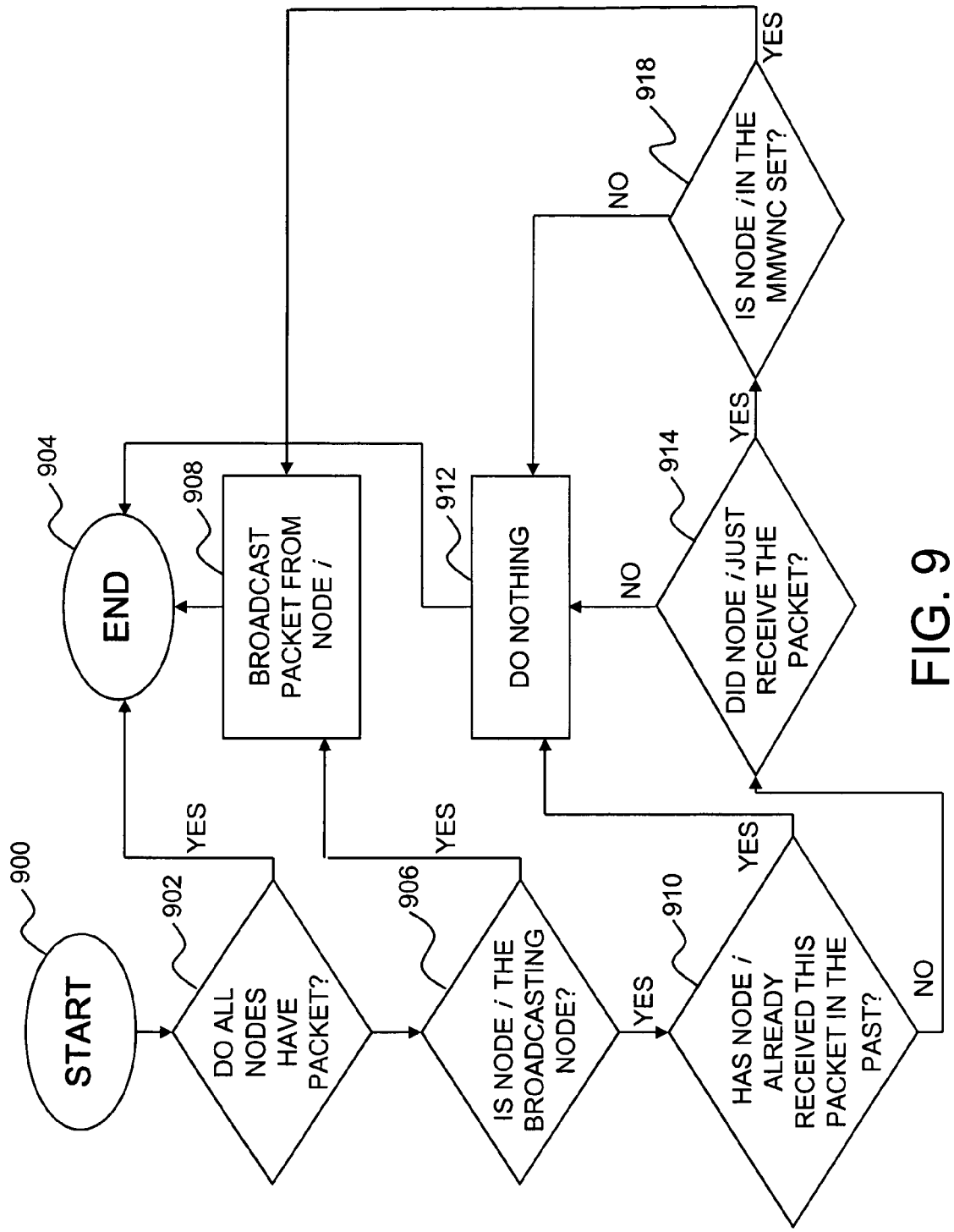
FIG. 9 is a flow chart depicting the steps of the MMWNC-PFA.

A flowchart showing the operations of a MMWNC Packet Forwarding Algorithm (MMWNC-PFA) for use with the present invention is depicted in FIG. 9. This flowchart depicts steps similar to those used in the MST-PFA, that were shown in FIG. 6. Upon the use of a technique such as MMWNC, the present invention requires that a packet forwarding algorithm (PFA) or protocol be utilized to distribute packets of information to the entire network. For applications where the MMWNC heuristic is utilized, the PFA takes advantage of the node costs created. As before, the PFA is expected to run in a real-time mode in a constantly changing communication environment; accordingly the tasks of each node upon reception of a packet must be minimized. After the start of the PFA 900, a check is performed to determine whether all of the nodes have the packet 902. If the nodes have the packet, the PFA ends 904. On the other hand, if not all of the nodes have the packet, a check is performed to determine whether the current node i is the broadcasting node 906. If the current node i is the broadcasting node, it broadcasts the packet 908 and the routine ends 904. If the current node i is not the broadcasting node, a check is performed to determine whether the current node i has already received the packet in the past 910. If the node has already received the packet in the past, it does nothing 912 and the routine ends 904. On the other hand, if the node has not received the packet in the past, a check is performed to determine whether the current node i just received the packet 914. If the current node i did not just receive the packet it does nothing 912 and the routine ends 904, since the packet must have been received in the past. Note that blocks 910 and 914 may be combined into one logical operation if these are the only two possibilities. If, on the other hand, the current node i did just receive the packet, a check is performed to determine whether the node i is in the MMNWC set 918. If the node i is not in the MMNWC set, it does nothing 912 and the routine ends 904. If, on the other hand, node i is in the MMNWC set, it broadcasts the packet 908, and the routine ends 904.

As discussed above relative to FIG. 9, the Packet Forwarding Algorithm (PEA) used in conjunction with the MMWNC set is straightforward. Each node belonging to the selected set forwards the packet only if it has received it for the first time. The set of nodes in the chain constitute a network backbone through which packets are broadcasted. The following pseudocode is provided for greater clarity regarding the MMWNC-PFA.

```
while (not all nodes have the packet) do
  begin
    for each node i do
      begin
        if (i = Originating Node) Broadcast Packet;
        else if (i has already received the packet) do nothing;
```

-continued

```
        else if (i has just received the packet)
            begin
                if i ∈ MMWNC Broadcast Packet
                else do nothing;
            end;
        end;
    end.
```

The MMWNC approach of this aspect of the invention requires more bandwidth to execute than the MST approach described above. However, it reduces the delay in packet delivery. The MST and the MMWNC approaches disclosed herein are similarly robust in comparison to the classical flooding technique.

What is claimed is:

1. A method for broadcasting packets through a computer network including a plurality of nodes, the method comprising steps of:

assigning topology-dependent costs to a network feature selected from a group consisting of nodes in the network and links between nodes in the network;

determining routes between all of the nodes in the network using the topology-dependent costs assigned to the network feature;

forwarding packets from an originating node along routes from the originating node to all other nodes in the network, whereby packets from the originating node are broadcast throughout the network, where the step of forwarding packets is performed by steps of:

determining whether all of the nodes in the network have the packet;

determining whether a current node is the broadcasting node;

when the current node is the broadcasting node, broadcasting the packet;

when the current node is not the broadcasting node, determining whether the current node already received this packet via a minimum spanning tree link in the past;

when the node has already received this packet via a minimum spanning tree link in the past, doing nothing;

when the node has not received this packet via a minimum spanning tree link in the past, determining whether the current node has just received a packet over a link, Li;

when the node has not just received a packet over a link Li, doing nothing;

when the node has just received a packet over a link Li, determining whether the link Li belongs in the minimum spanning tree;

when the link Li does not belong in the minimum spanning tree, doing nothing;

when the link Li belongs in the minimum spanning tree, determining whether there exist other links than Li in the minimum spanning tree;

when there are no other links than Li in the minimum spanning tree, doing nothing; and when there are other links than Li in the minimum spanning tree, broadcasting a packet from the current node.

2. A method for broadcasting packets through a computer network including a plurality of nodes, the method comprising steps of:

assigning topology-dependent costs to a network feature selected from a group consisting of nodes in the network and links between nodes in the network;

determining routes between all of the nodes in the network using the topology-dependent costs assigned to the network feature;

forwarding packets from an originating node along routes from the originating node to all other nodes in the network, whereby packets from the originating node are broadcast throughout the network, where the step of forwarding packets is performed by steps of:

determining whether all of the nodes in the network have the packet;

determining whether a current node is the broadcasting node;

when the current node is the broadcasting node, broadcasting the packet;

when the current node is not the broadcasting node, determining whether the current node already received this packet in the past;

when the node has already received this packet, doing nothing;

when the node has not received this packet, determining whether the current node has just received the packet;

when the node has not just received the packet over, doing nothing;

when the node has just received the packet, determining whether the node is in the modified minimum weighted node cover set;

when the node is not in the modified minimum weighted node cover set, doing nothing;

when the node is in the modified minimum weighted node cover set, broadcasting the packet from the current node.

3. An apparatus for facilitating the broadcast of packets through a computer network including a plurality of nodes, the apparatus comprising at least one node, where the node includes means for:

assigning topology-dependent costs to a network feature selected from a group consisting of nodes in the network and links between nodes in the network;

determining routes between all of the nodes in the network using the topology-dependent costs assigned to the network feature;

forwarding packets from an originating node along routes from the originating node to all other nodes in the network, whereby packets from the originating node are broadcast throughout the network, wherein the means for forwarding packets is performed by means for:

determining whether all of the nodes in the network have the packet;

determining whether a current node is the broadcasting node;

when the current node is the broadcasting node, broadcasting the packet;

when the current node is not the broadcasting node, determining whether the current node already received this packet via a minimum spanning tree link in the past;

when the node has already received this packet via a minimum spanning tree link in the past, doing nothing;

when the node has not received this packet via a minimum spanning tree link in the past, determining whether the current node has just received a packet over a link, Li;

when the node has not just received a packet over a link Li, doing nothing;

when the node has just received a packet over a link Li, determining whether the link Li belongs in the minimum spanning tree;

when the link Li does not belong in the minimum spanning tree, doing nothing;

when the link Li belongs in the minimum spanning tree, determining whether there exist other links than Li in the minimum spanning tree;

when there are no other links than Li in the minimum spanning tree, doing nothing; and when there are other links than Li in the minimum spanning tree, broadcasting a packet from the current node.

4. An apparatus for facilitating the broadcast of packets through a computer network including a plurality of nodes, the apparatus comprising at least one node, where the node includes means for:

assigning topology-dependent costs to a network feature selected from a group consisting of nodes in the network and links between nodes in the network;

determining routes between all of the nodes in the network using the topology-dependent costs assigned to the network feature;

forwarding packets from an originating node along routes from the originating node to all other nodes in the network, whereby packets from the originating node are broadcast throughout the network, where the means for forwarding packets is performed by means for:

determining whether all of the nodes in the network have the packet;

determining whether a current node is the broadcasting node;

when the current node is the broadcasting node, broadcasting the packet;

when the current node is not the broadcasting node, determining whether the current node already received this packet in the past;

when the node has already received this packet, doing nothing;

when the node has not received this packet, determining whether the current node has just received the packet;

when the node has not just received the packet over, doing nothing;

when the node has just received the packet, determining whether the node is in the modified minimum weighted node cover set;

when the node is not in the modified minimum weighted node cover set, doing nothing;

when the node is in the modified minimum weighted node cover set, broadcasting the packet from the current node.

5. A computer program product for facilitating the broadcast of packets through a computer network including a plurality of nodes, the computer program product comprising a computer readable medium including operation means, encoded therein, for:

assigning topology-dependent costs to a network feature selected from a group consisting of nodes in the network and links between nodes in the network;

determining routes between all of the nodes in the network using the topology-dependent costs assigned to the network feature;

forwarding packets from an originating node along routes from the originating node to all other nodes in the network, whereby packets from the originating node are broadcast throughout the network, wherein the means for forwarding packets is performed by means for:

determining whether all of the nodes in the network have the packet;

determining whether a current node is the broadcasting node;

when the current node is the broadcasting node, broadcasting the packet;

when the current node is not the broadcasting node, determining whether the current node already received this packet via a minimum spanning tree link in the past;

when the node has already received this packet via a minimum spanning tree link in the past, doing nothing;

when the node has not received this packet via a minimum spanning tree link in the past, determining whether the current node has just received a packet over a link, Li;

when the node has not just received a packet over a link Li, doing nothing;

when the node has just received a packet over a link Li, determining whether the link Li belongs in the minimum spanning tree;

when the link Li does not belong in the minimum spanning tree, doing nothing;

when the link Li belongs in the minimum spanning tree, determining whether there exist other links than Li in the minimum spanning tree;

when there are no other links than Li in the minimum spanning tree, doing nothing; and when there are other links than Li in the minimum spanning tree, broadcasting a packet from the current node.

6. A computer program product for facilitating the broadcast of packets through a computer network including a plurality of nodes, the computer program product comprising a computer readable medium including operation means, encoded therein, for:

assigning topology-dependent costs to a network feature selected from a group consisting of nodes in the network and links between nodes in the network;

determining routes between all of the nodes in the network using the topology-dependent costs assigned to the network feature;

forwarding packets from an originating node along routes from the originating node to all other nodes in the network, whereby packets from the originating node are broadcast throughout the network, where the means for forwarding packets is performed by means for:

determining whether all of the nodes in the network have the packet;

determining whether a current node is the broadcasting node;

when the current node is the broadcasting node, broadcasting the packet;

when the current node is not the broadcasting node, determining whether the current node already received this packet in the past;

when the node has already received this packet, doing nothing;

when the node has not received this packet, determining whether the current node has just received the packet;

when the node has not just received the packet over, doing nothing;

when the node has just received the packet, determining whether the node is in the modified minimum weighted node cover set;

when the node is not in the modified minimum weighted node cover set, doing nothing;

when the node is in the modified minimum weighted node cover set, broadcasting the packet from the current node.

* * * * *